US006868086B1

(12) United States Patent
Putzolu et al.

(10) Patent No.: US 6,868,086 B1
(45) Date of Patent: Mar. 15, 2005

(54) DATA PACKET ROUTING

(75) Inventors: David M. Putzolu, Forest Grove, OR (US); Erik J. Johnson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/538,331

(22) Filed: Mar. 29, 2000

(51) Int. Cl.[7] .................................................. H04L 12/28

(52) U.S. Cl. ................... 370/401; 370/395.53; 370/402

(58) Field of Search ................................ 370/351, 352, 370/353, 354, 356, 386, 389, 390, 395.53, 400, 401, 402, 392, 396, 398, 404, 405, 397, 370, 372, 395.1

(56) References Cited

U.S. PATENT DOCUMENTS 5,825,772 A * 10/1998 Dobbins et al. ............ 370/396
5,920,566 A * 7/1999 Hendel et al. .............. 370/401
5,920,699 A * 7/1999 Bare .......................... 709/225
5,959,989 A * 9/1999 Gleeson et al. ............. 370/390
5,999,541 A * 12/1999 Hinchey et al. ............ 370/466
6,128,666 A * 10/2000 Muller et al. ............... 370/401
6,147,995 A * 11/2000 Dobbins et al. ............ 370/392
6,151,324 A * 11/2000 Belser et al. ............... 370/397
6,157,647 A * 12/2000 Husak ........................ 370/401
6,167,052 A * 12/2000 McNeill et al. ............. 370/399
6,389,030 B1 * 5/2002 Coden ........................ 370/404
6,553,028 B1 * 4/2003 Tang et al. ................. 370/389
6,628,648 B1 * 9/2003 Francis et al. .............. 370/360
6,628,657 B1 * 9/2003 Manchester et al. ..... 370/395.1
6,680,945 B1 * 1/2004 Merchant et al. ...... 370/395.53

* cited by examiner

*Primary Examiner*—Phirin Sam
(74) *Attorney, Agent, or Firm*—Fish & Richardson P.C.

(57) ABSTRACT

A distributed device has external ports and a configurable internal communications network interconnecting the external ports. The network is configured to transmit a data packet received from one of the ports to a second of the ports according to a communications protocol of the internal network. The second of the ports connects to a destination of the data packet.

19 Claims, 5 Drawing Sheets

Routing Table

| DESTINATION | NEXT-HOP |
|---|---|
| Subnet A | port 12 |
| Subnet A | port 13 |
| Subnet B | port 14 |
| Subnet C | port 15 |
| | |
| | |

VLAN TABLE

| EGRESS PORT | VLAN ID |
|---|---|
| port 12 | VLAN A |
| port 13 | VLAN B |
| port 14 | VLAN C |
| | |
| | |
| | |

48

DATA PACKET ROUTING

BACKGROUND

This invention relates to routing data packets.

Data packet routing may be done by a router, which has a fixed number of ports for connecting to the subnetworks serviced by the router. The router centrally controls internal routing of packets from receiving ports to transmitting ports.

THE DRAWINGS

DESCRIPTION

Figure 1:
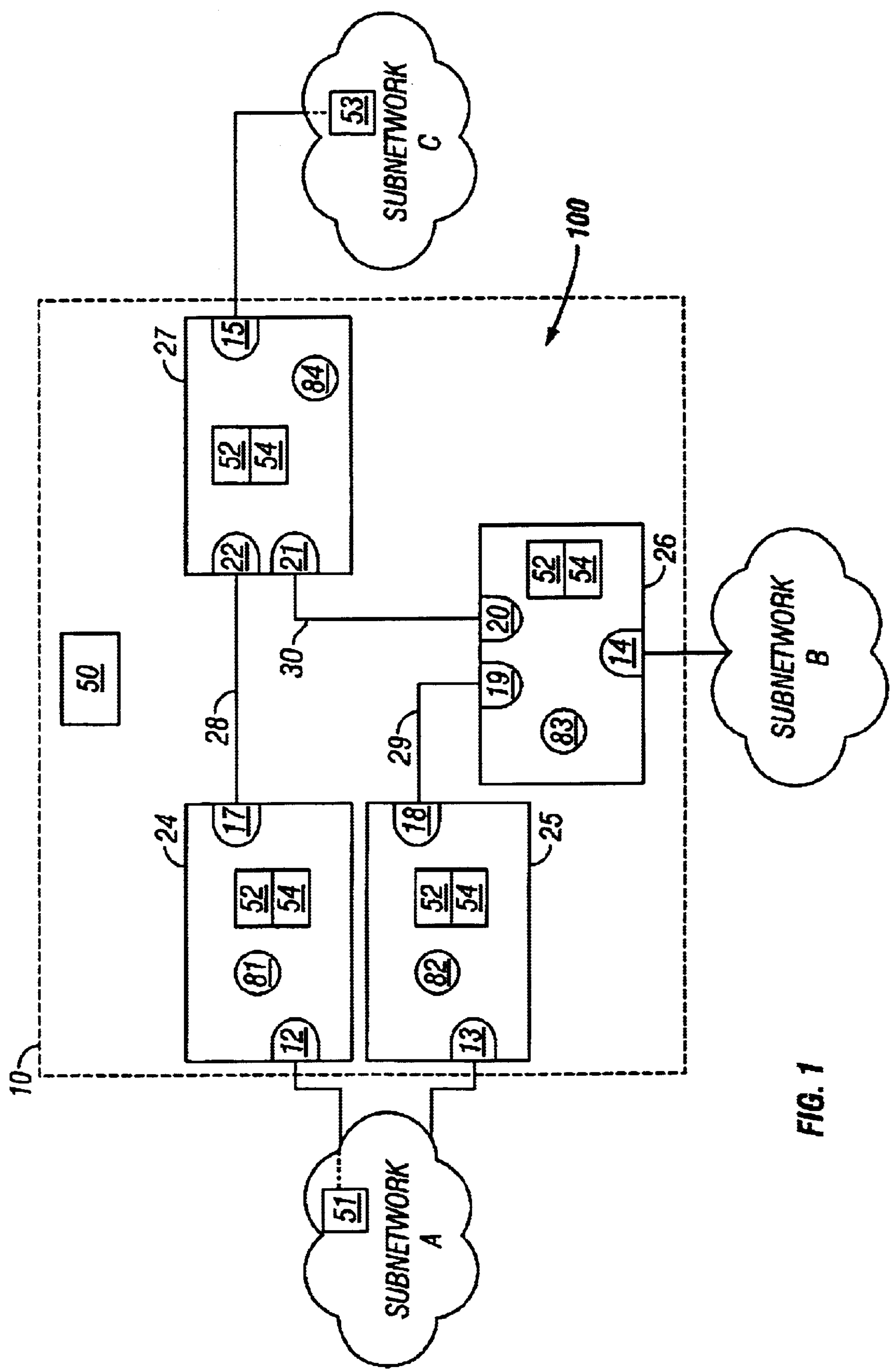
FIG. 1 shows a distributed router in accordance with embodiments of the invention.

In accordance with some embodiments of the invention, FIG. 1 shows a distributed device 10, which functions as a single logical router. The device 10 has several external ports 12–15, which are ingress and egress points for data packets received from and transmitted to external subnetworks A, B, C. The external ports 12–15 are located on forwarding elements 24–27, which interconnect through internal ports 17–22. To function as a logical router, the device 10 routes data packets among the configurable communications subnetworks A, B, C that connect to its external ports 12–15.

Figure 2:
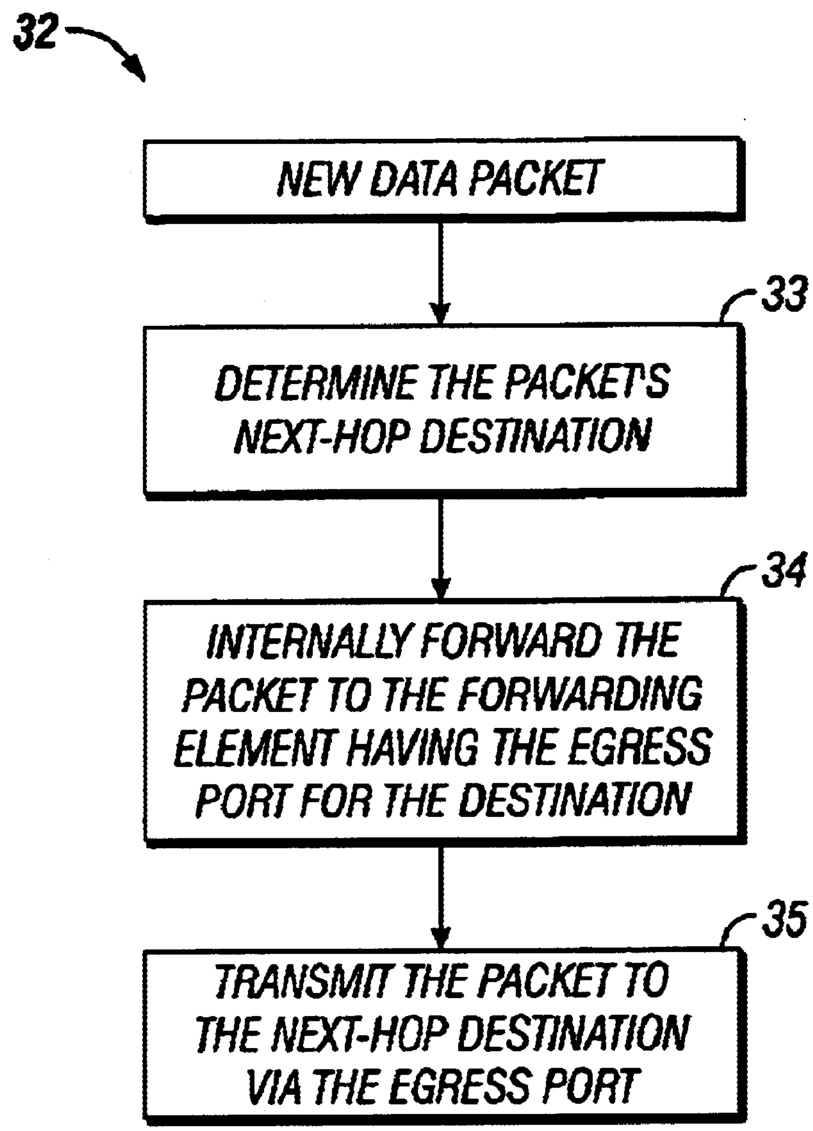
FIG. 2 shows a method of routing data packets with the router of FIG. 1 in accordance with embodiments of the invention.

FIG. 2 shows a method 32 used by the device 10 to route data packets received from the subnetworks A, D, C. In response to receiving a data packet at one of the ports 12–15, the device 10 determines the packet's next-hop destination (33). The next-hop destination is one of the subnetworks A, B, C connecting directly to the device 10. After finding the next-hop destination, the device 10 forwards the packet over an internal configurable communications network 100 (FIG. 1) to the forwarding element 24–27 on which the egress port 12–15 for the next-hop destination is located (34). Internal packet forwarding is needed because the packet's ingress and egress ports 12–15 may belong to different forwarding elements 24–27. Then, the forwarding element 24–27 transmits the packet through the egress port 12–15 to the next-hop destination (35).

The internal configurable communications network 100 that carries data packets between the forwarding elements 24–27 is formed of the forwarding elements 24–27 and lines 28–30 interconnecting internal ports 17–22 of the forwarding elements 24–27. With respect to the internal network, each forwarding element 24–27 acts as a bridge that receives data packets on its ports 12–15 (17–22) and selectively retransmits the received packets on its ports 17–22 (12–15). The forwarding elements 17–24, and the external devices that connect to the external ports 12–15 support a data-layer protocol.

The data-layer protocol is used to route data packets in internal network 10 inside the distributed device 10. In one embodiment, the data-layer protocol is the layer-two Ethernet protocol, which is commonly used for the data link layer of the transmission control protocol/internet protocol (TCP/IP), described in Cerf et al., IEEE Trans. on Comm., vol. COM-22 May 1974, 637–648.

Figures 3A, 3B, 3C:
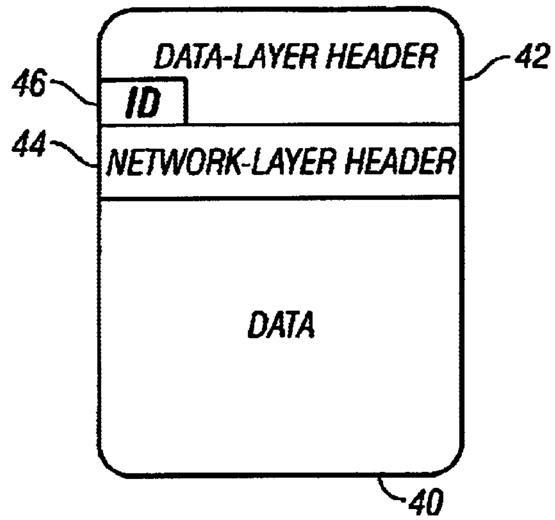
FIG. 3A shows the format of a data packet inside the distributed router.
FIG. 3B shows a routing table.
FIG. 3C shows a VLAN table.

FIG. 3A shows the format of a data packet 40 transmitted on internal network 100 among the forwarding elements 24–27 inside the device 10. The packet has both data-layer and network-layer headers 42, 44. The data-layer header 42 provides address data for forwarding the packet to a specifically identified forwarding element 24–27. The original data-layer header of the packet is replaced by the data-layer header 42 by the forwarding element 24–27 that initially receives the packet from one of the external subnetworks A, B, C. The forwarding elements 24–27 of the internal network 100 read the data-layer header 42 of the packet to identify which ports 12–15, 17–22 to use to retransmit the packet.

The network-layer header 44 provides address data for routing the packet between the different external subnetworks A, B, C. This address data is used by the forwarding element 24–27 of the ingress port to produce a data-layer header 42 that causes a packet forwarding to a port 12–17, 17–22 connected to the packet's next-hop subnetwork A, B, C.

The data-layer header 42 includes an identifier (ID) 46 for a virtual LAN (VLAN). A VLAN defines a logical broadcast domain of the internal network 100 of the device 10. A logical broadcast domain is a subnetwork over which a data packet identifying the domain as a destination may be transmitted either by switching or broadcasting by hubs. For example, a logical broadcast domain for a packet simply identifying a LAN address as its destination is the LAN. To transmit a data packet on a VLAN, a forwarding element 24–27 tags the data-layer header of the packet with the VLAN's identifier 46. The tag is read by the other forwarding elements 24–27 that receive the data packet. Each forwarding element 24–27 retransmits a packet tagged for a VLAN via a subset of its own ports 17–22 that connect to ports 17–22 belonging to the same VLAN. Each retransmission may be to each remaining port 17–22 of the forwarding element 24–27 that belongs to the same VLAN, i.e., data-layer broadcasting, or to the remaining port 17–22 by which the packet's destination is reachable, i.e., data-layer switching.

The forwarding elements may use spanning tree algorithms to determine which ports 12–15, 17–22 belong to each VLAN. Each spanning tree for a VLAN has an egress port 12–15 as a base. A data packet tagged for the VLAN is eventually delivered to the associated egress port 12–15. Each data packet is tagged with a VLAN identifier (VID) defined by its egress port 12–15.

As an example of packet forwarding, consider a packet received from port 13 and having a next-hop destination of the subnetwork C. Forwarding element 25 attaches a data-layer header identifying the VLAN for the egress port 15 and then retransmits the packet via port 18. Forwarding element 26 receives the packet and retransmits the packet only to the port 20 in response to reading the tag for the VLAN corresponding to the external port 15. Forwarding element 27 receives the packet and retransmits the packet only via the port 15 in response to reading the tag for the VLAN corresponding to the port 15.

Prior to retransmitting the packet to external port 15, the forwarding element 27 also removes the data-layer tag for a VLAN. These VLAN tags are used internally to route the packet over a VLAN inside the distributed device 10.

Besides ensuring packet delivery in the multiple domain internal configurable communications network 100 of the device 10, VLAN tagging can reduce packet traffic inside the device 10. Tagging reduces traffic, since the forwarding elements 24–27 retransmit tagged packets on only a portion of the total number of ports 12–15, 17–22 that are members of the VLAN identified in the tag. Traffic may be further reduced if the forwarding elements 24–27 perform packet switching instead of simply broadcasting packets over whole VLANs. The forwarding elements 24–27 store information on VLAN memberships of their own ports 12–15, 17–22. Without tagging, the forwarding elements 24–27 could indiscriminately broadcast data packets over each port 12–15, 17–22 to ensure delivery to the destination.

A control module 50 performs network-level routing calculations and prepares a routing table 48 of next-hop network-layer destinations. The table is shown in FIG. 3B. The routing table 48 assigns one or more external egress ports 12–15 to each next-hop destination subnetworks A, B, C. To make the table, the module 50 exchanges routing data with neighboring external routers 51, 53. The control module 50 regularly transmits updated versions of the network-layer routing table to each forwarding element 24–27, which store the table in an internal storage device 52. From the routing table 48 and the network-layer packet destinations, the forwarding elements 24–27 can determine the next-hop subnetworks A, B, C for received data packets.

FIG. 3C shows a VLAN table 49 that is stored on a storage medium 54 in each of the forwarding elements 24–27. The VLAN table 49 assigns a VLAN identifier (VID) to each egress port 12–15.

By distributing the ports 12–15 over separate elements 24–27, the device 10 can accommodate more packet ingress and egress points than a monolithic router. The distributed construction also provides flexibility so that the new ports 12–15 may be added to respond to increased packet bandwidth demands.

The elements 24–27 act cooperatively so that the distributed device 10 acts as a single logical router. For each data packet, only the forwarding element 24–27 associated with the packet's ingress port 12–15 updates the packet's network-layer header 46 and determines the packet's next-hop network-layer destination. Inside the device 10, the data-layer header 42 provides routing information so that other forwarding elements 24–27 need not further update the packet's network-layer header.

Figure 4:
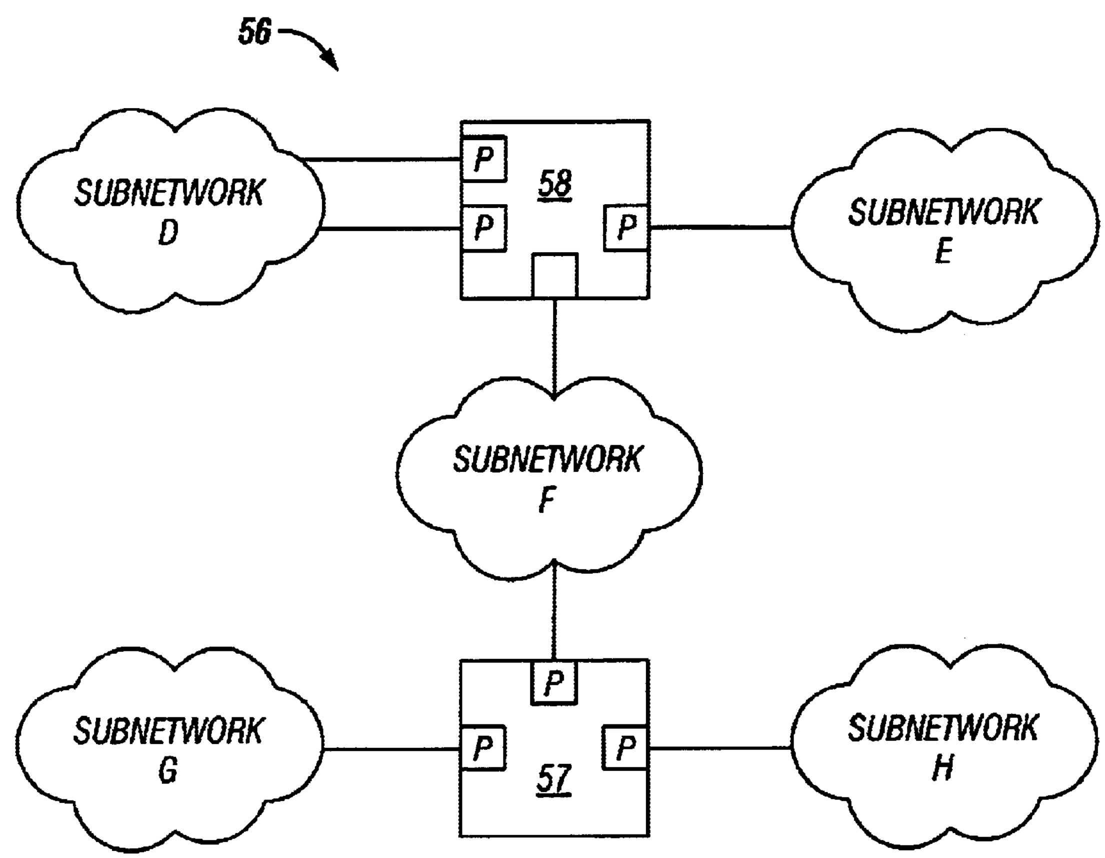
FIG. 4 shows a wide area network that uses distributed routers to route data packets in accordance with embodiments of the invention.

FIG. 4 shows a wide area network 56 that uses distributed routers 57–58 to route data packets between configurable communications subnetworks D–H. Each router 57–58 has a construction analogous to that of the device 10 shown in FIG. 1. Each router 57–58 includes individual forwarding elements that connect together to form an "internal" network. Each forwarding element has an external port P that directly connects to one of the external networks D–H connected to the router 57–58. The forwarding elements tag data packets with VLAN identifiers so that the packets may be forwarded between ingress and egress ports as has been described above for the device 10 of FIG. 1.

Figure 5:
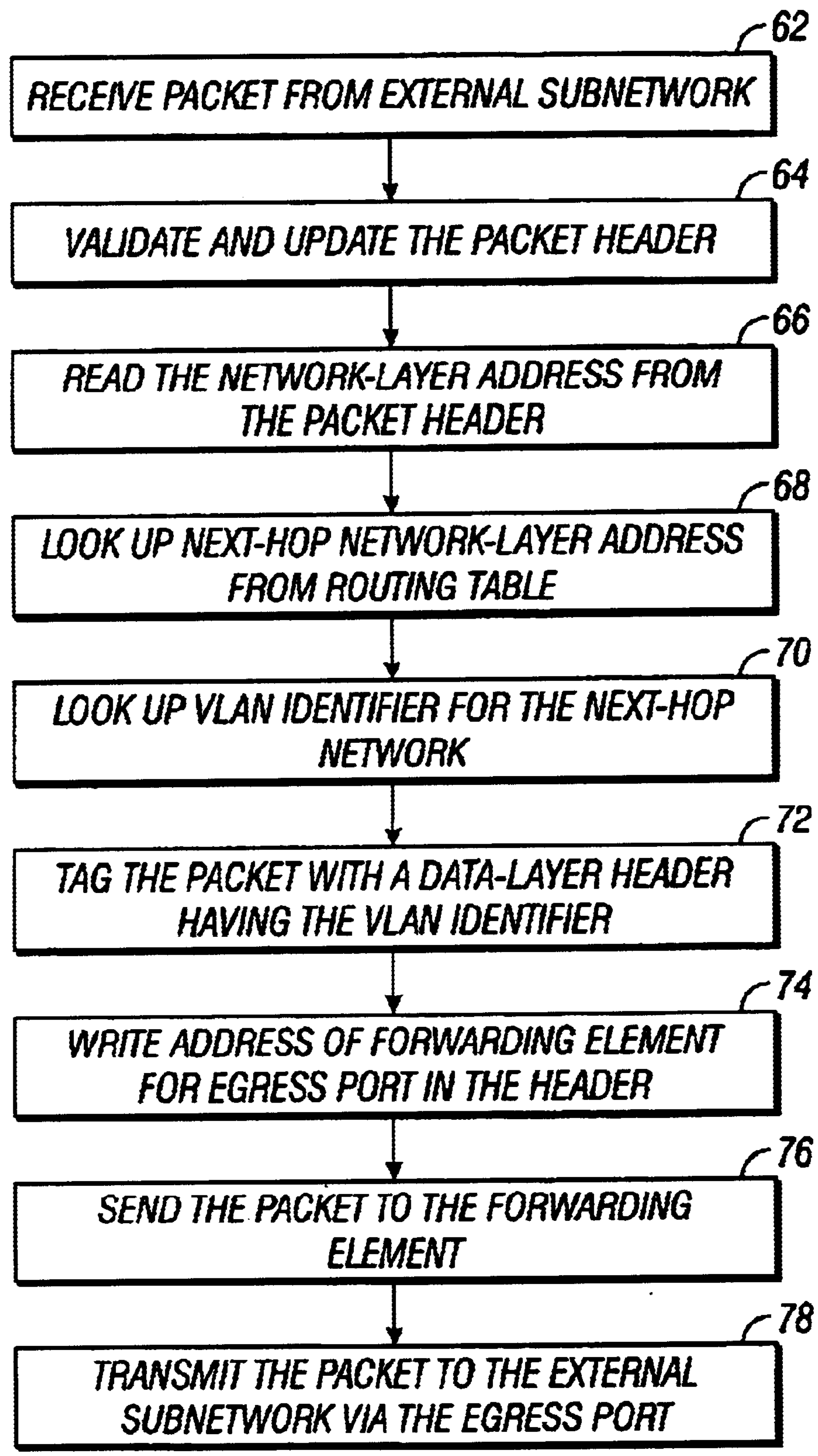
FIG. 5 shows a flow chart for another embodiment of a method of routing data packets.

FIG. 5 is a flow chart for another embodiment of a method 60 of routing a data packet between external subnetworks. The data packet is received from one of the external subnetworks via an ingress port, e.g., the port 15 of the forwarding element 27 for subnetwork C of FIG. 1 (step 62). The forwarding element associated with the ingress port validates and updates the packet's network-layer header (step 64). The validation includes checking the network-layer header's checksum. Packets with incorrect checksums are ignored. The update includes decrementing the network-layer header's time-to-live field to reflect one network-layer hop and recalculating and storing an appropriate value for the header's checksum.

If the network-layer header is valid, the forwarding element for the ingress port reads the packet's network-layer header to obtain the packet's destination address, e.g., an IP address (step 66). Using the destination address, the same forwarding element looks up the packet's next-hop subnetwork in its internal network-layer routing table (step 68). Using the identity of the next-hop network, the same forwarding element looks up a VLAN identifier for the next-hop subnetwork from its internal VLAN table (step 70).

The forwarding element for the ingress port tags the packet by attaching a data-layer header to the packet (step 72). The data-layer header includes a VLAN identifier that corresponds to the egress port connected to the next-hop subnetwork. The forwarding element for the ingress port also writes the data-layer destination in the data-layer header.

To determine the data-layer destination address of a packet, the forwarding element for a data packet's ingress port sends an address resolution protocol (ARP) request. The ARP packet is broadcasted over the VLAN appropriate to the data packet's next-hop subnetwork destination and received by the egress port connected to the next-hop subnetwork. The egress port removes the VLAN tag and broadcasts the ARP packet to the external subnetwork to which the port connects.

Each host on the net-hop subnetwork receives the ARP packet. The ARP packet indicates a network-layer destination address for which a data-layer address is requested and a data-layer address of the originator of the ARP request. Each host determines whether its own network-level address matches the address provided by the ARP packet. If a host detects a match, the host sends a directed response message back to the ARP originator, i.e., a message to the data-layer address of the originator of the ARP request. The response message identifies the data-layer address of the responding host device.

An ingress port that connects to the external subnetwork on which the responding host is located receives the response message. The ingress port attaches an appropriate VLAN tag and sends the response back to the forwarding element that made the ARP request. The forwarding element for the ingress port for the data packet receives the response and writes the data-layer address obtained from the response into the data-layer header of the data packet to be forwarded (step 74).

In some embodiments, the VLAN table, e.g., the table 54 of FIG. 1, lists one VLAN identifier for each next-hop subnetwork. Then, each next-hop subnetwork has a unique egress port and the associated forwarding element receives packets tagged for the identified VLAN.

In other embodiments, the VLAN table provides more than one VLAN identifier for some next-hop subnetworks. These subnetworks connect to more than one egress port. Each egress port is a member of one of the VLANs associated with the subnetwork. For example, in the device 10 of FIG. 1, both ports 12, 13 may be egress ports for the subnetwork A. If both are egress ports, the other forwarding elements 26, 27 may tag packets for forwarding to subnetwork A with the VLAN associated with either port 12, 13.

Tagging balances traffic to the egress ports 12, 13. This means that forwarding elements 26, 27 may randomly choose between tagging packets with the VLANs for ports 12 and 13 if both are egress ports to the subnetwork A.

The forwarding element for the ingress port sends the data packet with the data-layer header to the forwarding element for the egress port (step 76). The data-layer header tags the packet for the same VLAN found from the VLAN table. The forwarding elements of the internal network, which receive the packet, read the data-layer header and transmit the packet over the VLAN associated with the packet header's VLAN ID.

Upon receiving the data packet, the forwarding element for the egress port strips off the VLAN ID from the data-layer header and transmits the data packet to the destination subnetwork A, B (step 78).

The transmission over the internal network of the router involves data-layer operations, which do not further update the packet's network-layer header. Thus, the distributed router provides aggregate routing in which the packet's network-layer header is only updated once, i.e., by the forwarding element for the ingress port. The distributed router acts like a one-hop device at the network-layer.

Referring again to FIG. 1, the forwarding elements 24–27 include storage media 81–84 that store computer executable programs of instructions for performing the methods 32 and 60, shown in FIGS. 2 and 5. In other embodiments, the forwarding elements 24–27 include hardware that performs the method 32 and 60.

The ability to put a VID in a data-layer packet header, forward the packet with the VID, and strip the VID from the packet are described in the IEEE 802.1Q "Virtual Bridged LAN standard". The standard was drafted by the LAN MAN Standards Committee of the IEEE Computer Society, publ'd Feb. 20, 1998, and is available at site: www.manta.ieee.org/groups/802/1/.

Other embodiments are within the scope of the following claims.

What is claimed is:

1. A switching apparatus, comprising:

at least one internal port, adapted for connection to an internal port of another switching apparatus;

at least one external port, adapted for connecting to an external channel to receive information packets from and send information packets to the external channel; and internal switching logic, operating to receive incoming information packets from the external port intended for communication to an external channel connected to a different switching apparatus, and to replace a data layer header of the information packet with a VLAN header, in conventional WLAN format, which addresses said different switching apparatus, and to pass the information packet to its internal port with said WLAN header, to receive information packets on said internal port and to read said VLAN header and determine a switching of said information packets from said VLAN header and using a VLAN table to determine a switching of said information packets therefrom, and to switch the information packets to an internal port of another switching apparatus, or to remove the header and route to said external port, depending on contents of the VLAN header.

2. A switching apparatus as in claim 1, wherein the switching apparatus includes two internal ports, adapted for connection to respective internal ports of different other twitching apparatuses.

3. A switching apparatus as in claim 1, wherein the internal switching logic also validates a VLAN header of an incoming information packet.

4. A switching apparatus as in claim 3, wherein the internal switching logic determines a VLAN identifier for a next hop in the network, and wherein the VLAN header includes information indicative of the VLAN identifier.

5. A switching apparatus as in claim 1, further comprising another switching apparatus, connected to said switching apparatus, and having its internal ports connection to internal ports of said switching apparatus.

6. The switching apparatus of claim 1, wherein the switching apparatus and the another switching apparatus are included in a networking apparatus having a network identifier, and wherein the incoming information packets include information indicative of the network identifier in a network layer header of the incoming information packets.

7. The switching apparatus of claim 6, wherein the networking apparatus is selected from the group consisting of a switch and a router.

8. A switching system, comprising:

a first switching apparatus and a second switching apparatus, the first switching apparatus comprising:

at least one internal port, adapted for connection to an internal port of the second switching apparatus;

at least one external port, adapted for connecting to an external channel to receive information packets from and send information packets to the external channel; and internal switching logic, operating to receive incoming information packets from the external port intended for communication to an external channel connected to said second switching apparatus, to replace a data layer header of the including information Packets with a VLAN header, in conventional VLAN format, which addresses said second switching apparatus, and to pass the data to its internal port with said VLAN header, to receive information packets on said internal port from said second switching apparatus, and to read said VLAN header and determine a switching of said information packets from said VLAN header and determine a switching of said information packets therefrom, to switch the information packets to an internal port of said second switching apparatus, or to remove the VLAN header and route to said external port, depending on contents of VLAY header.

9. A switching system as in claim 8, further comprising a third switching apparatus, having its internal port connected to said internal port of said second switching apparatuses.

10. A switching apparatus as in claim 9, wherein the internal switching logic determines a VLAN identifier for a next hop in the network, and wherein the VLAN header includes information indicative of the VLAN identifier.

11. A switching apparatus as in claim 8, wherein the switching apparatus includes two internal ports, adapted for connection to respective internal ports of different other switching apparatuses.

12. A switching apparatus as in claim 8, wherein the internal switching logic also validates a said VLAN header on an incoming information packet.

13. A switching apparatus as in claim 8, further comprising another switching apparatus, connected to said switching apparatus, and having its internal ports connected to internal ports of said switching apparatus.

14. The switching system of claim 8, wherein the first switching apparatus and the second switching apparatus are included in a networking apparatus having a network identifier, and wherein the incoming information packets include information indicative of the network identifier in a network layer header of the incoming information packets.

15. The switching system of claim 14, wherein the networking apparatus is selected from the group consisting of a switch and a router.

16. An apparatus comprising a machine readable storage medium having executable instructions for routing data, the instructions enabling the machine to:

operate to receive incoming information packets from an external port intended for communication to an external channel connected to a different machine, replace a data layer header of the incoming information packets with a VLAN header, in conventional VLAN format which addresses the different machine, and to pass the incoming information packets to an internal port with said VLAN header, to receive at least one of said information packets on said internal port and to read its VLAN header and use a VLAN table to determine a switching of said information packet from said VLAN header and determine a switching of said information packet therefrom, and to switch the information packet to an internal port of another machine, or to route to said information packet to an external port, depending on contents of the VLAN header.

17. An apparatus as in claim 16, further comprising data instructions to validate information within said VLAN header.

18. The apparatus of claim 16, wherein the machine and the different machine are included in a networking apparatus having a network identifier, and wherein the incoming information packets include information indicative of the network identifier in a network layer header of the incoming Information packets.

19. The apparatus of claim 18, wherein the networking apparatus is selected from the group consisting of a switch and a router.

* * * * *